Sept. 13, 1932.  A. J. MANSURE  1,876,822
AUTOMATIC TEMPERATURE OR PRESSURE CONTROL
Filed Nov. 23, 1929
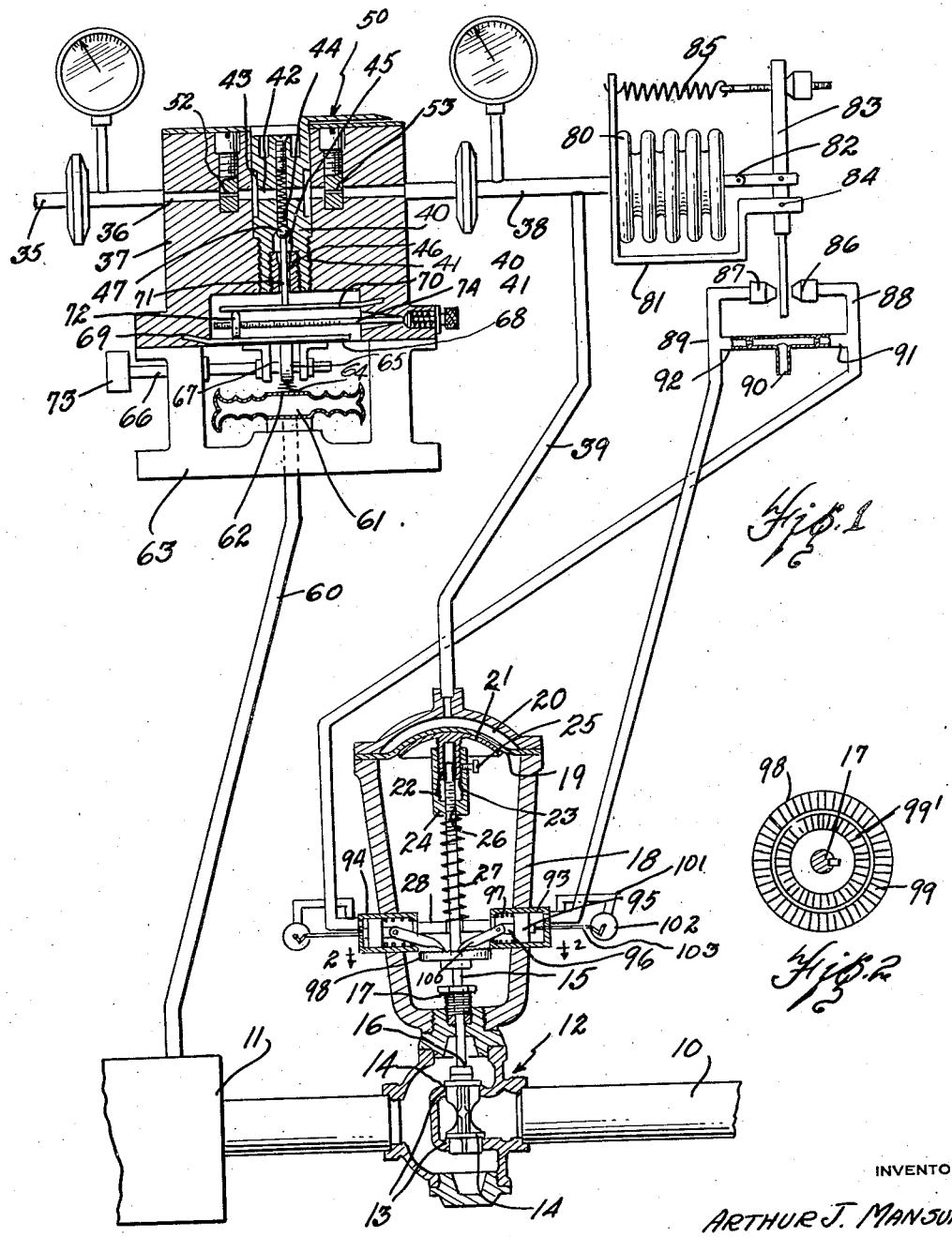
INVENTOR
ARTHUR J. MANSURE
BY Whittemore Hulbert
Whittemore + Belknap
ATTORNEYS Patented Sept. 13, 1932

1,876,822

UNITED STATES PATENT OFFICE

ARTHUR J. MANSURE, OF DETROIT, MICHIGAN

AUTOMATIC TEMPERATURE OR PRESSURE CONTROL

Application filed November 23, 1929. Serial No. 409,348.

This invention relates to control devices and has particular reference to a device for controlling the flow of a fluid or the like through a conduit. One of the objects of this invention is to provide a primary and secondary controls for regulating the flow of a fluid through a supply conduit together with means for bringing the secondary control into operation only upon unusual changes in the demand for the fluid at the point of use.

A further object of this invention is to provide a valve for controlling the flow of fluid through a conduit, temperature or pressure responsive means for actuating said valve, and auxiliary means for modifying the effective actuation of said valve at any given temperature or pressure.

Other objects and advantages of this invention together with the numerous novel details of construction will become more apparent as the following description proceeds, particularly when reference is had to the accompanying drawing, wherein Figure 1 is a semi-diagrammatic view of a control system constructed in accordance with the teachings of this invention, and Figure 2 is a fragmentary sectional view taken substantially on the line 2—2 of Figure 1.

Referring then particularly to the drawing wherein like reference characters designate corresponding parts throughout all views, the numeral 10 designates a conduit for supplying a fluid to a point of use such as the chamber 11. While the fluid supplied through the conduit 10 may be a heating, cooling or pressure controlling fluid, the invention will be described in connection with a system in which the pipe 10 supplies a heating medium to the chamber 11.

Arranged within the pipe 10 is a balanced valve 12 which includes the valve seats 13 and the valve members 14. A stem 15 is rotatably connected to the valve members as at 16 and extends upwardly through a bearing 17 formed in a supporting bracket 18 which carries at its upper end a diaphragm 19 closing one side of a chamber 20. Engaging the lower face of the diaphragm is a plate 21 provided with the depending stem 22 threaded as at 23 for threaded engagement with a sleeve 24. The sleeve 24 is adapted to be locked against rotation relative to the stem 22 by a set screw 25 and is provided with a threaded opening 26 for receiving the threaded upper end of the valve stem 17. A spring 27 bears at its one end against the collar 24 and at its other end against a collar 28 carried by the bracket 18 for normally urging the valve stem and valve members to open position. Obviously movement of the diaphragm 19 incident to a variation of pressure in the chamber 20 effects a movement or actuation of the valve members against the tension of the spring 27. The sleeve 24 provides means for adjusting the effective movement of the valve members upon any given movement of the diaphragm for a purpose hereinafter to be more fully described, it being obvious that rotation of the valve stem adjusts the valve members relative to their seats and thus adjusts the opening or closing of the valve by the diaphragm.

Air under pressure is supplied to the chamber 20 by a pipe 35 which communicates at its one end with a suitable source of air under pressure, (not shown) and at its other end with a bore 36 extending transversely of a body or casting 37. The opposite end of this bore communicates with a conduit 38 which in turn communicates with the chamber 20 by means of a conduit 39.

For regulating the pressure of air in the chamber 20 there is provided a valve body 40 threaded in a bore 41 formed in the body 37 and extending transversely of the bore 36. This valve body has the transversely extending bore 42 which is constantly maintained in communication with the bore 36 by means of an annular recess 43 and is provided with the bore 44 which places the bore 42 in communication with a chamber 45 formed within the valve body. A passage 46 provides communication between the chamber 45 and the atmosphere and a valve 47 arranged within the chamber 45 is adapted to seat on the end of the passage 44 and thus control communication between this passage and the chamber 45.

While the valve 47 is shown as seating on the lower end of the bore or passage 44, it is obvious that the same may be arranged to seat on the upper end of the passage 46, the valve in one case being a direct acting valve and in the other case a reverse acting valve. The valve body 40 may be threadedly adjusted longitudinally of the bore 41 to vary the position of the ports therein relative to the valve 47 and suitable indicating mechanism designated generally by the reference character 50 may be provided for indicating the position of the valve body. Further, orifice plates 52 and 53 may be mounted in the bore 36, the restricted orifice in the plate 52 rendering the valve 47 more sensitive to operation, and the restricted orifice in plate 53 acting to slow up the changes in pressure in the chamber 20.

For actuating the valve 47 a suitable thermostat or pressure responsive member (not shown) is mounted in the chamber 11 and this member is connected by a tube 60 with a diaphragm chamber 61 having the flexible top 62. This diaphragm chamber is carried by a bracket 63 secured to the body 37 and is thus arranged below the valve 47. The top 62 of this diaphragm chamber is arranged in abutting engagement with a spring 64 and the opposite end of this spring abuttingly engages a cam 65 mounted on a shaft 66. Brackets 67 carried by this shaft engage a spring plate 68 pivoted at its one end as at 69 in the body 37. A second plate 70 is pivoted to the opposite side of the body 37 and engages the stem 71 of the valve 47. The plates 68 and 70 are arranged in spaced relation to each other and a roller or the like 72 arranged between these plates provides means for moving the one from the other.

The arrangement is such that movement of the top wall 62 of the diaphragm chamber effects a movement of the valve 47 to regulate the exhaust of air from the bore 36. The cam 65 may be adjusted by a suitable handle 73 mounted on the shaft 66 and the roller 72 may be adjusted relative to the pivot points of the plates 68 and 70 by means of a threaded shaft 74 engaging this roller, to thus regulate the effective movement of the valve 47 upon any predetermined movement of the top 62 of the diaphragm chamber.

As thus far described the operation of the device is as follows. A set air pressure within predetermined limits is maintained within the chamber 20 by proper adjustment of the cam 65 and roller 72 to hold the valve 12 at its best working position and to permit the flow of sufficient heating, cooling or pressure fluid to the chamber to maintain the desired conditions within this chamber. Obviously if the temperature within the chamber 11 increases the valve 47 will be moved toward closed position thus permitting pressure to build up in the chamber 20 to partially close the valve 12. If on the other hand the temperature within the chamber 11 decreases beyond the desired temperature the valve 47 will be moved toward open position to permit more air to exhaust from the bore 36 and the chamber 20 and to permit the spring 27 to move the valve 12 toward open position. Thus the mechanism as thus far described will function to maintain the temperature within the chamber 11 at any predetermined desired degree.

During the normal operation of the device the valve 12 will move but slightly, the arrangement being such that a substantially constant pressure will be maintained within the chamber 20 to hold the valve 12 at its best working position. If, however, the demand for the fluid supplied by pipe 10 is increased or decreased beyond certain limits, difficulties are encountered in that the valve 12 will either be incapable of permitting sufficient fluid to pass to the chamber 11 or will be moved so far from its best working position as to function inefficiently to control the supply of fluid through the conduit 10. Accordingly the present invention contemplates in particular the provision of auxiliary means operable to act on the adjustable connection between the valve stem 15 and the diaphragm 20 to vary the effective actuation of the valve 12 by the diaphragm 20 upon a predetermined change in the demand for the fluid.

To accomplish this result there is provided a diaphragm chamber 80 communicating with the conduit 38 for receiving air under pressure therefrom. This chamber is supported by a bracket 81 and is provided with a stem 82 connected to a lever 83 pivoted as at 84 on the bracket. A spring 85 acts on one end of the lever 83 to balance the pressure within the diaphragm chamber to the normal pressure within the chamber 20 and conduit 38.

The opposite end of the lever 83 is arranged between the ports 86 and 87 formed on the ends of conduits 88 and 89 respectively. The ports 86 and 87 are adjustable relative to the end of the lever 83, this adjustment being provided in any desired manner, so that one or the other of these ports will be closed upon a predetermining movement of the lever about its pivot. Air under pressure is supplied to the conduits 88 and 89 by a suitable air supply pipe 90 having the branches 91 and 92 communicating with the said conduits.

The conduits 88 and 89 are extended downwardly and communicate with the ends of cylinders 94 and 93 respectively. These cylinders are carried by the sides of the bracket 18 and are thus positioned on opposite sides of the valve stem 17.

Arranged in the cylinder 93 is a piston 95 having a rod 96 which projects through the forward end of the cylinder. A spring 97 surrounds this piston rod and urges the piston rearwardly against the pressure of the air supplied to the same by the conduit 89.

As clearly illustrated in Figure 2 of the drawing, a collar 98 is fixed to the valve stem 17 and this collar is provided with an annular series of ratchet teeth 99 adapted for engagement by a pawl 100 carried by the end of the piston rod 96. Thus upon reciprocation of the piston 95, the pawl 100 will engage the ratchet to impart a step-by-step rotative movement to the collar 98 and stem 17 to threadedly adjust the stem 17 within the sleeve 24.

The conduit 89 is provided with a by-pass 101 which terminates in an exhaust valve 102 which may be of any desired construction and which is connected to the piston rod 96 by a link 103. The arrangement is such that when the piston 93 is moved forwardly by the pressure of the air in the conduit 89 the link 103 is moved by the rod 96 to actuate the valve 102 to permit the air to exhaust through the by-pass from the conduit 89. This reduces the pressure in back of the piston 93 and permits the spring 97 to return the piston to its rearward position at which time the link 103 functions to close the valve 102 thus permitting a pressure to again build up between the piston and the end of the cylinder. Thus when air under pressure is supplied to the cylinder through the conduit 89 the piston in the cylinder will be reciprocated to effect an actuation of the collar 98.

The cylinder 94 is provided with a similar piston rod and pawl for engagement with a second annular series of ratchet teeth 99' also carried by the collar 98. This series of ratchet teeth are inclined oppositely to the teeth 99 so that upon actuation of the piston in the cylinder 94 the stem 17 is rotatably adjusted in the opposite direction.

Air is constantly supplied to the conduits 88 and 89 by the supply pipe 90 and during the normal operation of the device, this air is exhausted through the ports 87 and 88. Upon a predetermined movement of the lever 83, however, one of the ports 87 or 88 is closed whereby pressure is built up in one of the conduits to effect an actuation of the piston in one of the cylinders. Thus if the lever moves to close the port 87, pressure is built up in the conduit 89 and the piston 95 in cylinder 93 is actuated to effect a clockwise rotation of the valve stem 17 and thus move the valve toward closed position. If on the other hand the port 86 is closed, the piston 95 in cylinder 94 is actuated to rotate the valve stem in the opposite direction and move the valve toward open position.

From the above it is believed that the operation of the invention will be clearly apparent. The cam 65 and roller 72 are initially set to maintain a predetermined desired pressure in the chamber 20 to hold the valve 12 in a position to maintain the desired temperature in the chamber 11. Upon slight variations in the temperature within the chamber 11 the valve 47 will be actuated to increase or decrease the pressure within the chamber 20 and to thus actuate the valve 12 to vary the flow of fluid to the chamber 11. Thus the valve 12 may be set at its best working position to maintain a substantially constant flow of fluid through the conduit 10 to maintain the chamber 11 at the desired temperature.

If, however, there is a decided change in the demand for the fluid supplied by the pipe 10 as for example, if this pipe is supplying a heating medium to a volume of water in the chamber 11 and this volume of water is substantially increased, then the auxiliary mechanism functions to increase the opening of the valve 12 to take care of this increased demand. Thus if the temperature within the chamber 11 drops owing to the increased volume of water, the valve 47 will be opened and the pressure within chamber 20 will be decreased to permit the valve 12 to fully open. If this complete opening of the valve 12 is not sufficient to supply the increased demand, the pressure within chamber 20 will continue to drop as will also the pressure within diaphragm chamber 80 and within a predetermined drop in diaphragm chamber 80, the spring 85 will move the lever 83 about its pivot to close port 86. The closing of port 86 will permit a building up of pressure in conduit 88 which will actuate the piston in cylinder 94 and effect a rotation of the valve stem 17 to thus adjust the connection between valve stem 17 and diaphragm 19. The valve stem will be rotated to shorten the connection between the diaphragm and the valve and to thus effect a wider opening of the valve at the same position of the diaphragm 19. The valve 12 will thus be adjusted to take care of the increased demand and in view of the adjustment of this valve the pressure within the chamber 20 will return to the predetermined set pressure.

The mechanism will function in this manner until a further substantial change in the demand for the fluid occurs in which event the auxiliary mechanism will function to again adjust the connection between valve 12 and diaphragm 19 to modify the action of this valve to take care of the changed demand.

Thus it will be apparent that the invention provides means for controlling the actuation of valve 12 between predetermined limits together with an auxiliary control for said valve operable upon a predetermined change in the demand for the fluid. Thus the valve 12 may be maintained at its best working range and the pressure within the chamber 20 set to maintain a constant temperature or pressure within the chamber 11.

While the mechanism for actuating the adjusting mechanism for the valve has been described as air operated, it will be readily understood that the mechanism may be operated by any fluid under pressure or by any other means controlled by a predetermined change in the pressure in diaphragm chamber 20. It will be further understood that the description is for the purposes of illustration only and is not definitive of the limits of the inventive idea, the right being reserved to make such changes in the details of construction and arrangement of parts as will fall within the purview of the attached claims.

What I claim as my invention is:

1. In combination, a fluid supply conduit, a valve for controlling the flow of fluid through said conduit, a member movable upon variations in the demand for the fluid, a connection between said member and said valve for actuating the latter from the former, and means for adjusting said connection to vary the effective actuation of the valve by said member upon a predetermined change in the demand for said fluid.

2. In combination, a fluid supply conduit, a valve for controlling the flow of fluid through said conduit, a diaphragm, means controlled by the demand for the fluid for actuating said diaphragm, a connection between said diaphragm and valve for actuating the latter upon movement of the former, and means for adjusting the length of said connection upon a predetermined change in the demand for the fluid.

3. In combination, a fluid supply conduit, a valve for controlling the flow of fluid through said conduit, a diaphragm, a pressure chamber to which said diaphragm is exposed, means controlled by the demand for the fluid for varying the pressure in said chamber, a connection between said diaphragm and said valve for actuating the latter upon movement of the former and means operable upon a predetermined change in the demand for the fluid to adjust the length of said connection to regulate the actuation of said valve at any given pressure in said chamber.

4. In combination, a chamber, a conduit for supplying a heat exchange fluid to said chamber, a valve in said conduit, a diaphragm, thermostatic means controlled by the temperature in said chamber for actuating said diaphragm, a connection between said diaphragm and said valve for actuating the latter upon movement of the former, and means operable upon a predetermined change in the temperature in said chamber for modifying the effective actuation of said valve by said diaphragm.

5. In combination, a valve for controlling the flow of a heat exchange fluid to a chamber, a diphragm, an adjustable connection between said diaphragm and valve for actuating the latter from the former, means controlled by the temperature in said chamber for actuating the diaphragm, and means operable upon a predetermined change in the temperature in said chamber to adjust said connection to vary the effective actuation of said valve by said diaphragm.

6. In combination, a valve for controlling the flow of a heat exchange fluid to a chamber, a diaphragm, an adjustable connection between said diaphragm and valve for actuating the latter from the former, means controlled by the temperature in said chamber for actuating the diaphragm, and means operable upon a predetermined change in the temperature in said chamber to adjust said connection to vary the effective actuation of said valve by said diaphragm, said last mentioned means including rachets for adjusting said connection, pawls for actuating said ratchets, a diaphragm chamber, and means operable upon a predetermined movement of said diaphragm chamber to actuate one or the other of said pawls.

7. In combination, a fluid supply conduit, a valve in the conduit, a stem for said valve, a diaphragm, a sleeve fixed to said diaphragm and threadedly engaging said stem, means controlled by the demand for the fluid for actuating said diaphragm, and means operable upon a predetermined change in the demand for the fluid to rotate said stem to threadedly adjust the same in said sleeve.

8. In combination, a fluid supply conduit, a valve in the conduit, a stem for said valve, a diaphragm, a sleeve fixed to said diaphragm and threadedly engaging said stem, means controlled by the demand for the fluid for actuating said diaphragm, and means operable upon a predetermined change in the demand for the fluid to rotate said stem to threadedly adjust the same in said sleeve, said means including a collar fixed to said stem, ratchets carried by said collar, and pawls engageable with said ratchets for rotating said collar.

9. In combination, a valve for controlling the flow of a heat exchange medium to a chamber, a pressure actuated member, a connection between said pressure actuated member and said valve for actuating the latter from the former, means for controlling the pressure acting on said pressure actuated member in dependence upon the demand for the fluid, and means for adjusting the length of the connection between said pressure actuated member and said valve upon a predetermined change in the pressure acting on said pressure actuated member.

10. In combination, a valve for controlling the flow of a heat exchange fluid to a chamber, a diaphragm connected to said valve for actuating the same, a chamber in which said diaphragm is mounted, means for varying the pressure in said chamber in dependence upon the demand for the fluid, an expansible and collapsible member communicating with said diaphragm chamber, and means operable only upon a predetermined movement of said expansible and contractable member to modify the actuation of said valve by said diaphragm.

11. In combination, a valve for controlling the flow of a heat exchange fluid to a chamber, a pressure responsive device for actuating said valve, means for controlling the pressure acting on said pressure responsive device in dependence upon the demand for the fluid, a second pressure responsive device exposed to the pressure acting on said first mentioned pressure responsive device, and means operable only upon a predetermined actuation of said second mentioned pressure responsive device to modify the effective actuation of said valve by said first mentioned pressure responsive device.

In testimony whereof I affix my signature.

ARTHUR J. MANSURE.